(12) United States Patent
Yasutomi

(10) Patent No.: US 8,773,721 B2
(45) Date of Patent: Jul. 8, 2014

(54) IMAGE PROCESSING APPARATUS AND IMAGE FORMING APPARATUS FOR PERFORMING HALFTONE PROCESSING ON POINT-OF-PURCHASE IMAGE

(75) Inventor: Kei Yasutomi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 900 days.

(21) Appl. No.: 12/487,417

(22) Filed: Jun. 18, 2009

(65) Prior Publication Data

US 2010/0002265 A1  Jan. 7, 2010

(30) Foreign Application Priority Data

Jul. 1, 2008 (JP) ................................. 2008-172222

(51) Int. Cl.
*G06K 15/00* (2006.01)

(52) U.S. Cl.
USPC ........... 358/3.06; 358/2.1; 358/3.1; 358/3.13; 358/3.17

(58) Field of Classification Search
CPC ................ H04N 1/40018; H04N 2201/33378; H04N 1/32256
USPC ................................................. 358/1.9–3.26
See application file for complete search history.

(56) References Cited

U.S. PATENT DOCUMENTS

| | | | |
|---|---|---|---|
| 5,489,991 A * | 2/1996 | McMurray ................... | 358/3.23 |
| 5,740,494 A | 4/1998 | Shoji et al. | |
| 5,999,773 A | 12/1999 | Yasutomi et al. | |
| 6,366,751 B1 | 4/2002 | Shakuto et al. | |
| 6,597,885 B2 | 7/2003 | Kai et al. | |
| 6,625,409 B2 | 9/2003 | Shakuto et al. | |
| 6,654,579 B2 | 11/2003 | Shakuto et al. | |
| 6,757,509 B2 | 6/2004 | Shoji et al. | |
| 6,778,805 B2 | 8/2004 | Kai et al. | |
| 6,800,410 B2 | 10/2004 | Yasutomi et al. | |
| 6,819,901 B1 | 11/2004 | Yasutomi et al. | |
| 6,978,109 B2 | 12/2005 | Shoji et al. | |
| 7,463,837 B2 | 12/2008 | Yasutomi | |
| 2002/0054396 A1* | 5/2002 | Tanaka et al. ................. | 358/519 |
| 2003/0208560 A1* | 11/2003 | Inoue et al. ................... | 709/219 |

(Continued)

FOREIGN PATENT DOCUMENTS

| | | |
|---|---|---|
| JP | 10-79856 | 3/1998 |
| JP | 11-15336 | 1/1999 |

(Continued)

OTHER PUBLICATIONS

Office Action issued May 8, 2012 in Japanese Patent Application No. 2008-172222.

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

A connection unit receives image data to be printed and image information on a type of the image data from an external device. A pseudo-halftone processing unit converts the image data into pseudo-halftone image data. When the image information received from the external device indicates that the type of the image data is a point-of-purchase advertising image, the pseudo-halftone processing unit performs a pseudo-halftone processing on the image data at a quantization level of three or more bits on a pixel and takes a growth order causing all pixels in a low-density area to grow averagely.

17 Claims, 9 Drawing Sheets

(56) References Cited

U.S. PATENT DOCUMENTS

| | | |
|---|---|---|
| 2005/0088697 A1 | 4/2005 | Yasutomi et al. |
| 2006/0066910 A1* | 3/2006 | Yasutomi ............... 358/3.13 |
| 2006/0152764 A1* | 7/2006 | Loce et al. ............. 358/3.06 |
| 2007/0103730 A1* | 5/2007 | Yasutomi ............... 358/3.2 |
| 2008/0013975 A1 | 1/2008 | Yasutomi et al. |
| 2008/0056784 A1 | 3/2008 | Nakamura et al. |
| 2008/0056785 A1 | 3/2008 | Maruyama et al. |
| 2008/0219702 A1 | 9/2008 | Tsukamoto et al. |
| 2008/0261768 A1 | 10/2008 | Miyawaki et al. |
| 2009/0003904 A1 | 1/2009 | Yasutomi et al. |
| 2009/0074431 A1 | 3/2009 | Aoki et al. |

FOREIGN PATENT DOCUMENTS

| | | |
|---|---|---|
| JP | 2001-53978 | 2/2001 |
| JP | 3728614 | 10/2005 |
| JP | 2007-25307 | 2/2007 |
| JP | 2007-190862 | 8/2007 |

* cited by examiner

FIG. 4

PLANE 1

| 0 | 30 | 92 | 1 | 31 | 90 |
|---|---|---|---|---|---|
| 15 | 45 | 107 | 16 | 46 | 105 |
| 61 | 76 | 121 | 60 | 76 | 121 |
| 0 | 31 | 91 | 0 | 30 | 91 |
| 16 | 46 | 106 | 15 | 45 | 106 |
| 60 | 75 | 122 | 61 | 76 | 120 |

PLANE 2

| 1 | 32 | 93 | 3 | 33 | 92 |
|---|---|---|---|---|---|
| 17 | 47 | 109 | 18 | 48 | 107 |
| 63 | 78 | 123 | 62 | 77 | 123 |
| 2 | 33 | 93 | 2 | 32 | 93 |
| 17 | 48 | 108 | 17 | 47 | 108 |
| 62 | 77 | 124 | 63 | 78 | 122 |

PLANE 3

| 3 | 34 | 95 | 5 | 35 | 94 |
|---|---|---|---|---|---|
| 18 | 49 | 110 | 20 | 50 | 109 |
| 65 | 80 | 125 | 64 | 79 | 125 |
| 4 | 34 | 94 | 4 | 34 | 95 |
| 19 | 50 | 110 | 19 | 49 | 110 |
| 64 | 79 | 126 | 65 | 80 | 124 |

PLANE 4

| 5 | 35 | 97 | 7 | 37 | 96 |
|---|---|---|---|---|---|
| 20 | 51 | 112 | 22 | 52 | 111 |
| 67 | 82 | 127 | 66 | 81 | 127 |
| 6 | 36 | 96 | 6 | 36 | 97 |
| 21 | 51 | 111 | 21 | 51 | 112 |
| 66 | 81 | 127 | 67 | 82 | 126 |

PLANE 5

| 7 | 37 | 99 | 8 | 39 | 98 |
|---|---|---|---|---|---|
| 22 | 52 | 114 | 24 | 54 | 113 |
| 68 | 84 | 128 | 68 | 83 | 129 |
| 8 | 38 | 98 | 8 | 38 | 99 |
| 23 | 53 | 113 | 23 | 53 | 114 |
| 68 | 83 | 129 | 69 | 84 | 128 |

PLANE 6

| 9 | 39 | 101 | 10 | 41 | 100 |
|---|---|---|---|---|---|
| 24 | 54 | 116 | 25 | 56 | 115 |
| 70 | 85 | 130 | 70 | 85 | 131 |
| 10 | 40 | 100 | 9 | 40 | 101 |
| 25 | 55 | 115 | 25 | 55 | 116 |
| 69 | 85 | 131 | 71 | 86 | 130 |

PLANE 7

| 11 | 41 | 103 | 12 | 42 | 102 |
|---|---|---|---|---|---|
| 26 | 56 | 118 | 27 | 58 | 117 |
| 72 | 87 | 132 | 72 | 87 | 133 |
| 12 | 42 | 102 | 11 | 42 | 102 |
| 27 | 57 | 117 | 26 | 57 | 118 |
| 71 | 86 | 133 | 73 | 88 | 132 |

PLANE 8

| 13 | 43 | 105 | 14 | 44 | 103 |
|---|---|---|---|---|---|
| 28 | 58 | 120 | 29 | 59 | 119 |
| 74 | 89 | 134 | 74 | 89 | 135 |
| 14 | 44 | 104 | 13 | 43 | 104 |
| 29 | 59 | 119 | 28 | 59 | 119 |
| 73 | 88 | 135 | 75 | 90 | 134 |

PLANE 9

| 136 | 139 | 148 | 137 | 141 | 147 |
|---|---|---|---|---|---|
| 137 | 141 | 150 | 139 | 143 | 149 |
| 144 | 146 | 151 | 144 | 145 | 152 |
| 136 | 140 | 147 | 136 | 140 | 148 |
| 138 | 142 | 149 | 138 | 142 | 150 |
| 143 | 145 | 152 | 144 | 146 | 151 |

PLANE 10

| 153 | 156 | 165 | 154 | 158 | 164 |
|---|---|---|---|---|---|
| 154 | 158 | 167 | 156 | 160 | 166 |
| 161 | 163 | 168 | 161 | 162 | 169 |
| 153 | 157 | 164 | 153 | 157 | 165 |
| 155 | 159 | 166 | 155 | 159 | 167 |
| 160 | 162 | 169 | 161 | 163 | 168 |

PLANE 11

| 170 | 173 | 182 | 171 | 175 | 181 |
|---|---|---|---|---|---|
| 171 | 175 | 184 | 173 | 177 | 183 |
| 178 | 180 | 185 | 178 | 179 | 186 |
| 170 | 174 | 181 | 170 | 174 | 182 |
| 172 | 176 | 183 | 172 | 176 | 184 |
| 177 | 179 | 186 | 178 | 180 | 185 |

PLANE 12

| 187 | 190 | 199 | 188 | 192 | 198 |
|---|---|---|---|---|---|
| 188 | 192 | 201 | 190 | 194 | 200 |
| 195 | 197 | 202 | 195 | 196 | 203 |
| 187 | 191 | 198 | 187 | 191 | 199 |
| 189 | 193 | 200 | 189 | 193 | 201 |
| 194 | 196 | 203 | 195 | 197 | 202 |

PLANE 13

| 204 | 207 | 216 | 205 | 209 | 215 |
|---|---|---|---|---|---|
| 205 | 209 | 218 | 207 | 211 | 217 |
| 212 | 214 | 219 | 212 | 213 | 220 |
| 204 | 208 | 215 | 204 | 208 | 216 |
| 206 | 210 | 217 | 206 | 210 | 218 |
| 211 | 213 | 220 | 212 | 214 | 219 |

PLANE 14

| 221 | 224 | 233 | 222 | 226 | 232 |
|---|---|---|---|---|---|
| 222 | 226 | 235 | 224 | 228 | 234 |
| 229 | 231 | 236 | 229 | 230 | 237 |
| 221 | 225 | 232 | 221 | 225 | 233 |
| 223 | 227 | 234 | 223 | 227 | 235 |
| 228 | 230 | 237 | 229 | 231 | 236 |

PLANE 15

| 238 | 241 | 250 | 239 | 243 | 249 |
|---|---|---|---|---|---|
| 239 | 243 | 252 | 241 | 245 | 251 |
| 246 | 248 | 253 | 246 | 247 | 254 |
| 238 | 242 | 249 | 238 | 242 | 250 |
| 240 | 244 | 251 | 240 | 244 | 252 |
| 245 | 247 | 254 | 246 | 248 | 253 |

FIG. 5
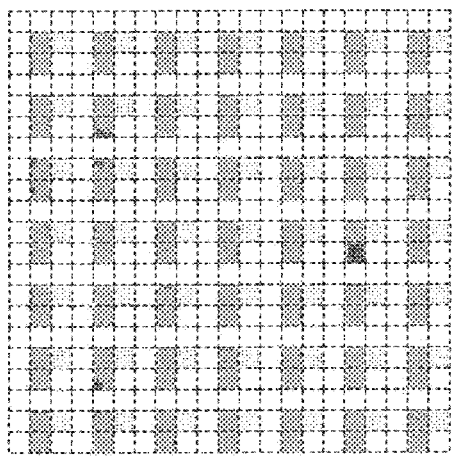
PATTERN OF 34/255 DATA
AFTER BEING SUBJECTED TO
DITHERING
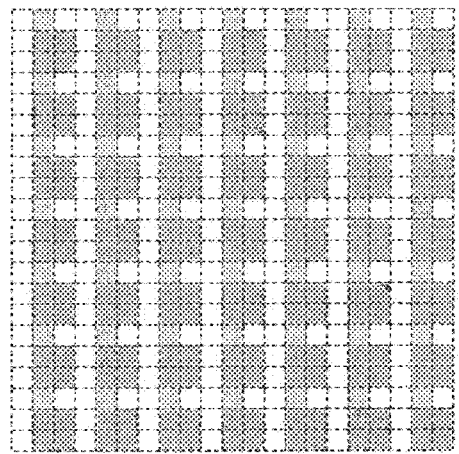
64/255
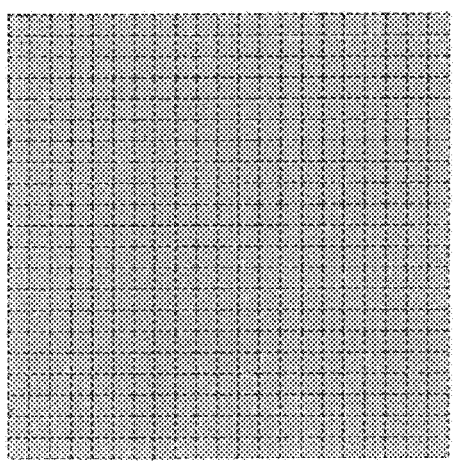
136/255
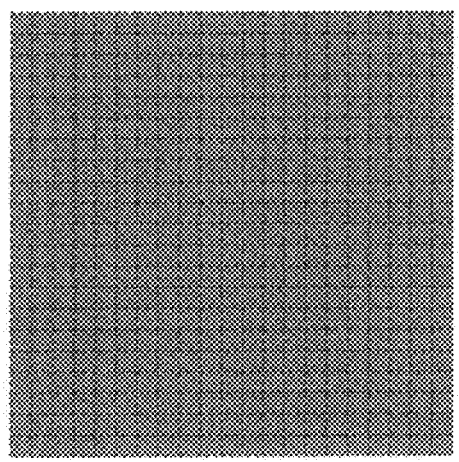
187/255

RELATION AMONG PERIODIC STRUCTURE, MAIN/SUB VECTORS, AND SCREEN ANGLE/RULING IN LINE SCREEN

MAIN VECTOR: $\bar{a0}^{\omega} = (a0x, a0y) = (-1, 3)$

SUB VECTOR: $\bar{a1}^{\omega} = (a1x, a1y) = (3, 1)$ $$\text{SCREEN RULING} = (\text{RESOLUTION}) \times \frac{\sqrt{a0x^2 + a0y^2}}{|a0x \, a1y - a0y \, a1x|}$$

SCREEN ANGLE = atan2 (a0y, a0x)

FIG. 9

PLANE 1

| 0 | 85 | 119 | 51 |
|---|---|---|---|
| 34 | 17 | 69 | 103 |
| 120 | 52 | 1 | 86 |
| 68 | 102 | 35 | 18 |

PLANE 2

| 2 | 87 | 121 | 53 |
|---|---|---|---|
| 36 | 19 | 71 | 105 |
| 122 | 54 | 3 | 88 |
| 70 | 104 | 37 | 20 |

PLANE 3

| 4 | 89 | 123 | 55 |
|---|---|---|---|
| 38 | 21 | 73 | 107 |
| 124 | 56 | 5 | 90 |
| 72 | 106 | 39 | 22 |

PLANE 4

| 6 | 91 | 125 | 57 |
|---|---|---|---|
| 40 | 23 | 75 | 109 |
| 126 | 58 | 7 | 92 |
| 74 | 108 | 41 | 24 |

PLANE 5

| 8 | 93 | 127 | 59 |
|---|---|---|---|
| 42 | 25 | 77 | 111 |
| 128 | 60 | 9 | 94 |
| 76 | 110 | 43 | 26 |

PLANE 6

| 10 | 95 | 129 | 61 |
|---|---|---|---|
| 44 | 27 | 79 | 113 |
| 130 | 62 | 11 | 96 |
| 78 | 112 | 45 | 28 |

PLANE 7

| 12 | 97 | 131 | 63 |
|---|---|---|---|
| 46 | 29 | 81 | 115 |
| 132 | 64 | 13 | 98 |
| 80 | 114 | 47 | 30 |

PLANE 8

| 14 | 99 | 133 | 65 |
|---|---|---|---|
| 48 | 31 | 83 | 117 |
| 134 | 66 | 15 | 100 |
| 82 | 116 | 49 | 32 |

PLANE 9

| 136 | 146 | 150 | 142 |
|---|---|---|---|
| 140 | 138 | 145 | 149 |
| 151 | 143 | 137 | 147 |
| 144 | 148 | 141 | 139 |

PLANE 10

| 153 | 163 | 167 | 159 |
|---|---|---|---|
| 157 | 155 | 162 | 166 |
| 168 | 160 | 154 | 164 |
| 161 | 165 | 158 | 156 |

PLANE 11

| 170 | 180 | 184 | 176 |
|---|---|---|---|
| 174 | 172 | 179 | 183 |
| 185 | 177 | 171 | 181 |
| 178 | 182 | 175 | 173 |

PLANE 12

| 187 | 197 | 201 | 193 |
|---|---|---|---|
| 191 | 189 | 196 | 200 |
| 202 | 194 | 188 | 198 |
| 195 | 199 | 192 | 190 |

PLANE 13

| 204 | 214 | 218 | 210 |
|---|---|---|---|
| 208 | 206 | 213 | 217 |
| 219 | 211 | 205 | 215 |
| 212 | 216 | 209 | 207 |

PLANE 14

| 221 | 231 | 235 | 227 |
|---|---|---|---|
| 225 | 223 | 230 | 234 |
| 236 | 228 | 222 | 232 |
| 229 | 233 | 226 | 224 |

PLANE 15

| 238 | 248 | 252 | 244 |
|---|---|---|---|
| 242 | 240 | 247 | 251 |
| 253 | 245 | 239 | 249 |
| 246 | 250 | 243 | 241 |

FIG. 10
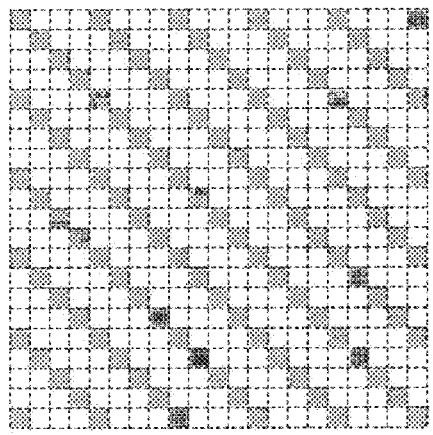
PATTERN OF 34/255 DATA
AFTER BEING SUBJECTED TO
DITHERING
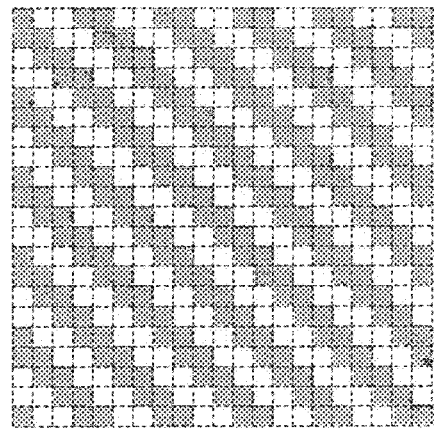
64/255
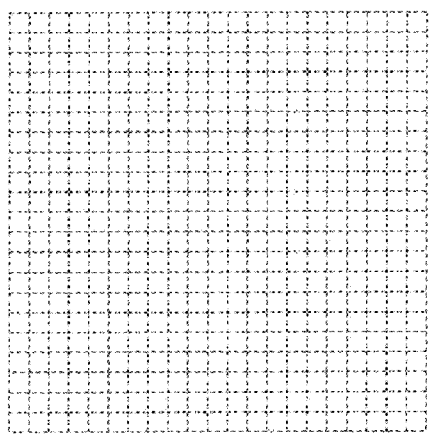
136/255
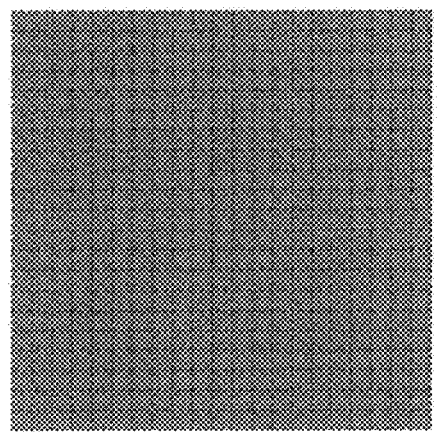
187/255
FIG. 11
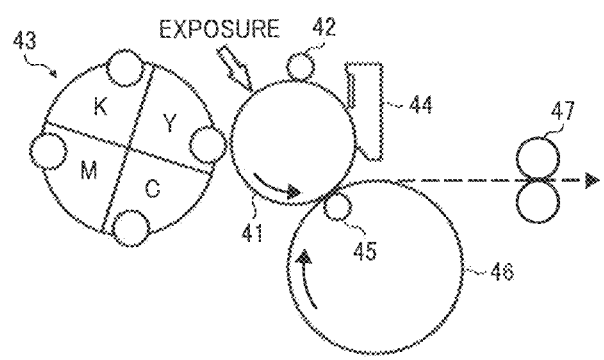

IMAGE PROCESSING APPARATUS AND IMAGE FORMING APPARATUS FOR PERFORMING HALFTONE PROCESSING ON POINT-OF-PURCHASE IMAGE

CROSS-REFERENCE TO RELATED APPLICATIONS

The present application claims priority to and incorporates by reference the entire contents of Japanese priority document 2008-172222 filed in Japan on Jul. 1, 2008.

BACKGROUND OF THE INVENTION

1. Field of the Invention

The present invention relates to an image processing apparatus applicable to an image forming apparatus, such as a copier, a printer, and a facsimile machine, and more particularly, to a growth order of a dither matrix applied to image data in association with dithering as a form of a halftone processing method.

2. Description of the Related Art

As one of types of image data input to an image forming apparatus, there is a continuous-tone image such as a photo image. Such continuous-tone image data is multi-level data of 8 bits to 12 bits per pixel. However, the number of expressible gradation levels per pixel by an image forming apparatus (including an electrophotographic image forming apparatus), which forms an image on a recording medium such as a paper sheet (i.e., outputs an image in so-called hardcopy), is virtually very small. To cope with insufficient gradation levels, such hardcopy equipment converts input image data into a pseudo-halftone image in such a manner that the resolution is enhanced, and an image density is a really modulated on the basis of a plurality of pixels. Image processing performed on input image data in a step of converting the input image data into a pseudo-halftone image is referred to as halftone processing. The present invention relates to a growth order of a dither matrix applied to image data in association with dithering as a form of the halftone processing method (i.e., a method for processing input image data into output image data responding to an output image graduating from low to high densities or an output image in multiple colors).

For details of a quantization process of multi-level image data with the dithering, refer to, for example, pages 51 to 59 of DENSHI SHASHIN GAKKAISHI (Electrophotography), vol. 24, no. 1 (1985). An image subjected to a dithering process has a periodic image structure. As types of dithering, there are mainly (1) clustered-dot dithering (dot screening), (2) Bayer dithering, and (3) line dithering (line screening). Characteristics of these dithering are explained in detail below.

(1) Clustered-Dot Dithering

In a clustered-dot dither matrix, a growth order (the order of pixels to be written from the one having a low image density to the one having a high image density) in a planar direction is the order from a pixel closest to a pixel called a growth center to a pixel peripheral to the growth center. Therefore, in the clustered-dot dither matrix, dots are arranged to be overlapped with other dots so that a dot overlapping area is relatively large (thus, it is possible to shorten a perimeter of a halftone dot composed of some dots). In most of image forming apparatuses (including an electrophotographic image forming apparatus, an inkjet image forming apparatus, and an offset printing machine), it is a fact that a periphery of a dot spreads outside an ideal dot boundary (i.e., a phenomenon called "dot gain" occurs).

Due to the dot gain, an image having a higher density than a target image density is output, which leads to a decrease in gradation reproducibility. However, in the clustered-dot dither matrix capable of expanding a dot overlapping area, it is possible to reduce the effect of the dot gain (because the spread of the dots is offset in the dot overlapping area, so that an image is not subject to adverse effect due to the dot spread).

Therefore, the clustered-dot dither matrix makes possible to output an image with a high gradation reproducibility. Although the clustered-dot dither matrix has such an advantage, the clustered-dot dither matrix has also disadvantages as follows. In the clustered-dot dither matrix, a periodic structure of the growth center needs to be substantially square in shape, so that a possible screen ruling and a flexibility of a screen angle in the dither matrix are disadvantageously low. In a color image forming apparatus that forms a color image by overlapping a plurality of different color screens, these disadvantages lead to an image defect that a false color called color moire appears on the image is prone to occur.

(2) Bayer Dithering

A Bayer dither matrix has a property opposite to that of the clustered-dot dither matrix. In the Bayer dither matrix, dots are dispersed so that the dots are discretely arranged as far as possible. Therefore, the Bayer dither matrix can maintain the resolution high. However, the Bayer dither matrix has a disadvantage of a low gradation reproducibility (this is because it is susceptible to the effect of dot gain). In an old-type low-resolution (of up to 300 dpi) image forming apparatus, the Bayer dither matrix capable of maintaining the resolution high was used. However, nowadays, a high-resolution (of up to 600 dpi or 1200 dpi) image forming apparatus has been widespread, so that there are not many requirements of maintaining the resolution high by the use of the Bayer dither matrix. Thus, the Bayer dither matrix has become seldom used recently.

(3) Line Dithering

In a line dither matrix, a growth order of dots is determined in accordance with the order from a pixel closest to a virtual line called a center line to a pixel farthest from the center line. In the clustered-dot dither matrix, the periodic structure of the growth center needs to be substantially square in shape, so that a possible screen ruling and a flexibility of a screen angle in the dither matrix are disadvantageously low. However, in the line dither matrix, there is no difference between a case where the periodic structure of the growth center is rectangular or parallelogram in shape and a case where the periodic structure of the growth center is square in shape. Therefore, it is possible to increase a degree of freedom of a selection from combinations of a possible screen ruling and a screen angle. Thus, the line dither matrix is effective when a color image is formed by overlapping a plurality of different color screens. When the different color screens are overlapped to form the color image, a moire pattern called color moire may appear on the color image depending on a combination of a possible screen ruling and a screen angle, which leads to an image defect of the color image. To prevent the color moire from appearing, the different color screens are generally set at an angle with one another (set to have an angular difference of at least 20 degrees between them). For example, when a full-color image is formed, to reduce the color moire, screen angles of cyan (C), magenta (M), yellow (Y), and black (K) color screens are individually set so that an angular difference between them can be as large as possible. When the line dither matrix is used, as described above, there are various combinations of a screen ruling and a screen angle. In regard to this point, the line dither matrix is more favorable than the clustered-dot dither matrix.

Furthermore, in the line dither matrix, there is one directional axis (i.e., the line dither matrix has the periodic structure only in one direction), so that four directional axes of the C, M, Y, and K color screens can be set in a range of 0 to 180 degrees. Thus, in the line dither matrix, color moire is less prone to appear. Incidentally, in the clustered-dot dither matrix, there are two directional axes, so that directional axes of the C, M, Y, and K color screens need to be set within a range of 0 to 90 degrees, and thus color moire is prone to appear. For such reasons, by the use of the line dither matrix, a fine image that color moire is suppressed can be obtained easily. Although the line dither matrix has such advantages, a gradation reproducibility is lower than that of the clustered-dot dither matrix. This is because in the line dither matrix, as compared with the clustered-dot dither matrix, dots are discretely arranged especially in an area where a dot-area ratio is small such as a highlight portion, so that it is susceptible to the effect of dot gain. Especially, in a case of an electrophotographic image forming apparatus, if dots are discretely arranged, an exposure energy is dispersed when a photosensitive element is exposed to a laser beam to form an electrostatic latent image on the photosensitive element. Thus, the highlight portion may be formed in off-color. Namely, when the line dither matrix is used in the electrophotographic image forming apparatus, it is difficult to express gradation of color in the highlight portion.

By the way, a conventionally well-known point-of-purchase advertising (hereinafter, "a POP image"), such as an outdoor advertising signboard of a retail store, a poster, and a price card attached to a wall or a ceiling in a store, is recognized as a type of image different from types of a text image, a graphic image, a photo image, and the like. For example, Japanese Patent No. 3728614 discloses a method for outputting a POP image with stable hues in combination with a specific developing method. Furthermore, Japanese Patent Application Laid-open No. H11-15336 discloses an image forming apparatus capable of forming an image without decrease in image density even when an output image is a high-density image such as a POP image.

Moreover, although it is not the invention relating to a POP image, Japanese Patent Application Laid-open No. 2001-53978 discloses a technique for correcting image data depending on image information (information on a type of image, for example, information indicating that an output image is a graphic image) from an external device (a printer driver).

Specifically, Japanese Patent No. 3728614 discloses a non-magnetic mono-component contact development method. In this method, at least two toners are arbitrarily selected from C, M, Y, K, and white toners, and the selected toners are mixed to be used for development. A potential difference between a potential of a latent image on an image carrier as an object to be developed and a potential of a developing bias applied to a developing roller is set to be equal to or larger than a maximum potential difference among potentials to be respectively saturated by a development concentration when each of the toners before being mixed is subjected to the development, and the development is performed with the mixed toner.

By such a configuration, even when a mixed toner obtained by mixing any of the C, M, Y, K, and white toners is used for development, a selective development does not occur. Therefore, even in a continuous printing of an image of a constant hue with a mixed toner in a desired color created by mixing commonly-marketed cheap color toners, it is possible to print the image with a stable hue.

When there is a request for printing a POP image although not in full-color but in specific colors, the toners used to be customized conventionally. However, according to the invention disclosed in Japanese Patent No. 3728614, it is not necessary to customize the toners, and it is possible to output the POP image with stable hues.

The image forming apparatus disclosed in Japanese Patent Application Laid-open No. H11-15336 includes a control unit that outputs a replenishment instruction to a replenishing unit. Upon receipt of the replenishment instruction from the control unit, the replenishing unit replenishes a toner to a developing unit. A mode setting unit informs the control unit whether an image of an original is a high-density image. Furthermore, when a second comparing unit detects that a count number becomes equal to a cycle-out number that is set in advance, the control unit suspends a job, and clears the cycle-out number. Moreover, the control unit outputs a job resumption instruction or a toner replenishment instruction to the replenishing unit depending on a result of determination by a concentration comparing unit.

By such a configuration, the image forming apparatus disclosed in Japanese Patent Application Laid-open No. H11-15336 can solve the conventional problem that a toner concentration is decreased due to the lack of a toner when an image having a higher density than that of a general document, such as a POP image, is formed because a regularly-supplied toner amount is insufficient with respect to a toner amount used in development.

A color image processing apparatus disclosed in Japanese Patent Application Laid-open No. 2001-53978 includes a graphic processing unit and a graphic concentration correcting unit. When image information received from the external device indicates that input image data is a graphic image, the graphic processing unit processes the input image data. The graphic concentration correcting unit corrects a concentration of the graphic image. When the concentration of the graphic image to be processed is low, the graphic processing unit causes the graphic concentration correcting unit to correct color information so as to change the low concentration to a reproducible concentration.

In a conventional configuration, a color of a line thinner than a dither pattern cannot be expressed faithfully, and also the line cannot be drawn at all. These are serious problems for an application using a thin line frequently, such as a computer-aided design system (CAD). However, the color image processing apparatus disclosed in Japanese Patent Application Laid-open No. 2001-53978 can process image data without losing a line image in thin line processing, and also can reproduce the line image.

Japanese Patent Application Laid-open No. 2007-025307 discloses an image forming apparatus. The image forming apparatus includes an image processing apparatus and an image forming unit. The image processing apparatus includes a halftone processing unit that converts multicolored image data into pseudo-halftone image data. The image forming unit includes a photosensitive element and a developing unit capable of developing a latent image into a color toner image with any of a plurality of color toners. The image forming unit forms a color image in such a manner that a plurality of different color toner images are superimposed on the photosensitive element, the superimposed toner images on the photosensitive element are collectively transferred onto a transfer medium. The halftone processing unit performs halftone processing (a multi-level quantization process), specifically, quantizes the image data at a quantization level of 3 or more bits on a pixel-by-pixel basis. Furthermore, the halftone processing unit causes all pixels in a high-density area to grow averagely in accordance with a growth order (causes all pixels in a high-density area to grow uniformly).

By such a configuration, the image forming apparatus disclosed in Japanese Patent Application Laid-open No. 2007-025307 can solve the conventional problem in superimposing toner images on the photosensitive element that "when the second color toner or the subsequent color toner is supplied for development, a toner adhesion amount is significantly different between a toner layer area and a non-toner layer area on the photosensitive element" by a different method from conventional methods.

However, there has not been developed a halftone processing technique by the application of any dither matrix characterizing a POP image.

In halftone processing based on an area coverage modulation generally-employed in hardcopy equipment including an electrophotographic image forming apparatus, an image density is a really modulated on the basis of a plurality of pixels, and input image data is converted into a pseudo-halftone image (graduations from a low density to a medium density and from the medium density to a high density can be reproduced by changing a ratio of a toner adhesion area to a non-toner adhesion area).

Therefore, in the halftone processing based on the area coverage modulation, for example, when a toner adhesion amount is controlled to be smaller than a maximum adhesion amount, a proportion of the toner adhesion area is reduced, thereby increasing a proportion of a white background portion (an area where a portion of a paper sheet is exposed).

However, when an output image is a POP image, the method that the toner adhesion amount is controlled by increasing the proportion of the white background portion leads to the following problems. A POP image puts emphasis on an image quality of an area having a uniform density (generally, called "a solid patch"). As a typical color of the solid patch, in addition to C, M, Y, and K colors, high-density colors of red (R), green (G), and blue (B) are major examples. Other colors located in an outermost ward of a color reproducible range (the color gamut) also fall under the color of the solid patch. Why a POP image puts emphasis on an image quality is concretely described below. An area having a uniform density in a POP image has to be entirely covered with a toner image, i.e., a surface of a paper sheet is strongly required not to be exposed. Therefore, if such an area where the surface of the paper sheet is exposed (or a lower-level toner layer is exposed), as is common in the area coverage modulation, is formed in the solid patch, a user has an impression that "the solid patch is not colored finely", which results in a factor of user dissatisfaction.

When an image having an area where the surface of the paper sheet is exposed by the area coverage modulation is formed, the reason why a user is dissatisfied with a formed image is not sure. The inventors of the present application speculate the reason why user is dissatisfied with the formed image is that a dot-like or line-like structure (a periodic structure in a dithered image) appears in a portion supposed to be a uniform density.

If all colors can be expressed while preventing the surface of the paper sheet from being exposed, it can be expected that a user would not feel such dissatisfaction that "the solid patch is not colored finely". However, in the halftone processing based on the current area coverage modulation, if it is configured not to expose the surface of the paper sheet, it is not possible to adjust a toner adhesion amount. Thus, it is not possible to reproduce a color reproduced by changing a toner amount subtly (especially, a color reproduced by a combination of at least two different color toners, such as slightly-yellowish red that is reproduced by reducing an amount of M-toner slightly to be smaller than that is required to reproduce red).

Furthermore, to achieve output image in the same color among different models of image forming apparatuses, each of the image forming apparatuses needs to change a toner amount subtly to reproduce the same color. This is because, for example, a spectral reflectivity of toner to be used and the order of toner images to be formed on a paper sheet are different depending on the models. Therefore, even when different models of image forming apparatuses intend to reproduce the same color, a toner adhesion amount is different depending on the models. Thus, to reproduce the same color among different models of image forming apparatuses, each of the image forming apparatuses needs to change a toner amount subtly to adjust the color.

In a conventional technology, such a subtle change of toner amount is generally made by performing the area coverage modulation. In other words, in the halftone processing based on the current area coverage modulation, when it is controlled not to expose the surface of the paper sheet, a toner amount for the same image cannot be adjusted. Thus, it is not possible to reproduce the same color among different models of image forming apparatuses.

Moreover, in the area coverage modulation, a toner adhesion amount is controlled by producing a white background portion. However, according to a review of this method by the inventors of the present application, a white light comes to be mixed into a reflected light from a toner image, so that a reproducibility of a high-saturation and high-brightness color (i.e., a vivid and bright color) is poor. An impressive POP image is preferred, so that the poor reproducibility of the high-saturation and high-brightness color is a major disadvantage.

SUMMARY OF THE INVENTION

It is an object of the present invention to at least partially solve the problems in the conventional technology.

According to one aspect of the present invention, there is provided an image processing apparatus including a connection unit that receives image data to be printed and image information on a type of the image data from an external device and a pseudo-halftone processing unit that converts the image data into pseudo-halftone image data. When the image information received from the external device indicates that the type of the image data is a point-of-purchase advertising image, the pseudo-halftone processing unit performs a pseudo-halftone processing on the image data at a quantization level of three or more bits on a pixel and takes a growth order causing all pixels in a high-density area to grow averagely.

Furthermore, according to another aspect of the present invention, there is provided an image processing apparatus including a connection unit that receives image data to be printed and image information on a type of the image data from an external device and a pseudo-halftone processing unit that converts the image data into pseudo-halftone image data. When the image information received from the external device indicates that the type of the image data is a point-of-purchase advertising image, the pseudo-halftone processing unit performs a pseudo-halftone processing on the image data at a quantization level of three or more bits on a pixel, takes a growth order causing pixels in a low-density area to grow pixel-by-pixel up to an intermediate quantization level, and takes a growth order causing all pixels in a high-density area to grow averagely.

The three types of dithering described above differ in growth order of the dither matrix in the planar direction (the order of pixels composing the dither matrix to fill in the dither matrix with respect to an image graduating from a low density to a high density). On the other hand, the present invention relates to the growth order of the dither matrix in the depth direction (in the present invention, halftone processing is performed at a quantization level of 3 or more bits, so that there is a flexibility to control a density of even one pixel, and such flexibility in controlling the density is referred to as the growth order in the depth direction). Therefore, the present invention can be applied to all the types of dithering (1) to (3).

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 shows a Y-color dither matrix used by the image processing apparatus shown in FIG. 1;

FIG. 5 shows data after being subjected to a dithering process with the dither matrix shown in FIG. 4;

FIG. 9 shows a C-color dither matrix used by an image processing apparatus according to a second embodiment of the present invention;

FIG. 10 shows data after being subjected to a dithering process with the dither matrix shown in FIG. 9; and FIG. 11 is a schematic configuration diagram of a full-color image forming apparatus including a revolver-type developing device.

DETAILED DESCRIPTION OF THE PREFERRED EMBODIMENTS

Exemplary embodiments of the present invention are explained in detail below with reference to the accompanying drawings.

Figure 1:
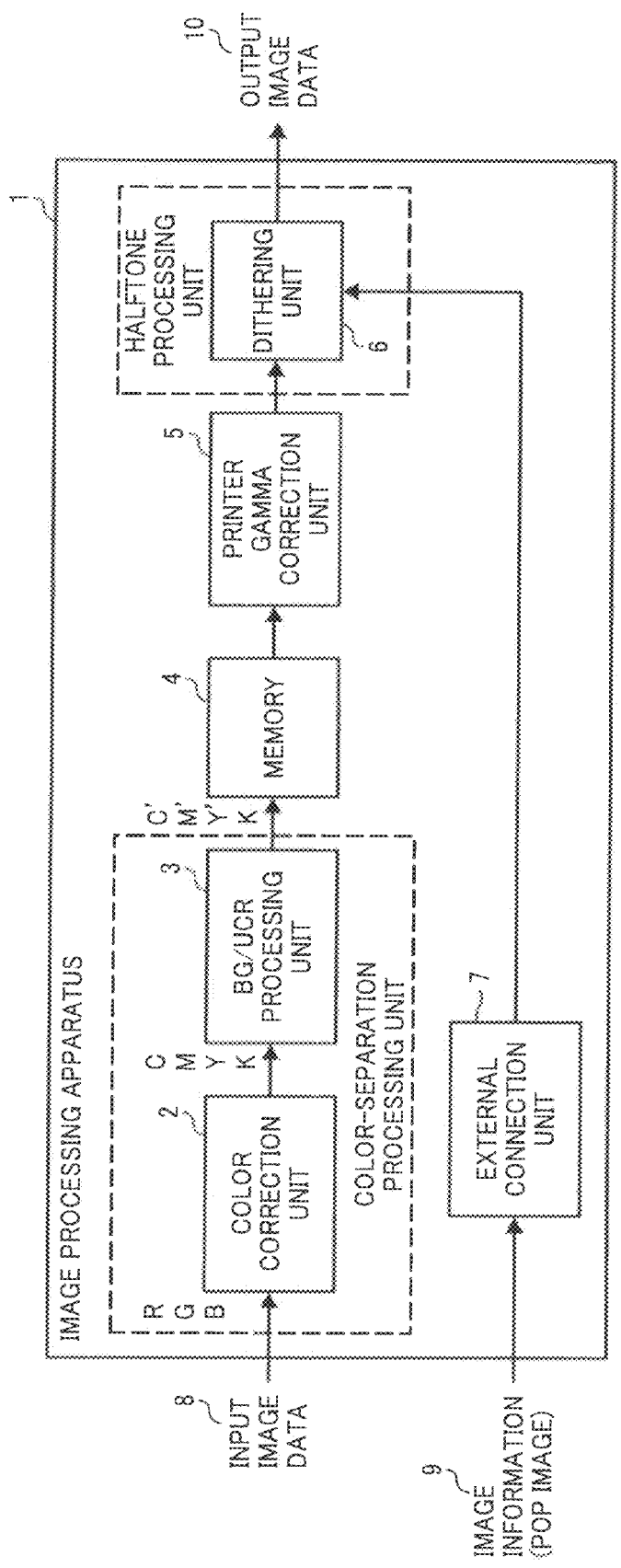
FIG. 1 is a block diagram of an image processing apparatus according to a first embodiment of the present invention.

FIG. 1 is a block diagram of an image processing apparatus 1 according to a first embodiment of the present invention. The image processing apparatus 1 includes a color correction unit 2, a BG/UCR processing unit 3, a memory 4 as a storage unit, a printer gamma correction unit 5, a dithering unit 6, and an external connection unit 7. The color correction unit 2 and the BG/UCR processing unit 3 compose a color-separation processing unit. Furthermore, the dithering unit 6 corresponds to a halftone processing unit. In the present embodiment, the image processing apparatus 1 is configured to receive image information 9 together with input image data 8. The image information 9 is information indicating a type of the input image data 8, for example, that the input image data 8 is an POP image. In this example shown in FIG. 1, a target image is determined as a POP image based on a content of the image information 9, so that the image processing apparatus 1 performs halftone processing suitable for the POP image on the input image data 8. Specifically, the image processing apparatus 1 switches a dither matrix to the one for the POP image.

First, image processing performed on the input image data 8 is explained below.

In the example shown in FIG. 1, the input image data 8 is three 8-bit digital image signals respectively for R, G, and B color images (hereinafter, "RGB color image signals") The color correction unit 2 converts the RGB color image signals into four 8-bit color image signals respectively for C, M, Y, K color images (hereinafter, "CMYK color image signals"). In the present embodiment, the color correction unit 2 converts the RGB color image signals into the CMYK color image signals by the use of a direct look-up table (DLUT).

There is described the DLUT below. A color space of the input image data 8 (i.e., an RGB color space) is divided into small unit cubes, and output values (of CMYK data) corresponding to grid points are obtained by a method to be described later. The output values are stored in a form of the DLUT. Input values other than the grid points are calculated by interpolation. In the present embodiment, as a method of the interpolation, tetrahedral interpolation is employed. In the tetrahedral interpolation, each unit cube is separated into six unit tetrahedrons, and interpolation is performed. In the present embodiment, the 8-bit CMYK color image signals are obtained by these methods.

Subsequently, how to create the DLUT is explained below. To create the DLUT, first, it is necessary to build a color prediction model. The inventors of the present application prepared monochromatic property data and mixed-color property data with respect to all combinations of 10 levels of gradational steps by each of the C, M, Y, and K colors. Namely, with an experimental apparatus capable of outputting C, M, Y, and K color images, 10000 color patches in different colors, i.e., 10000 toner images in different colors were formed on a paper sheet in practice. Then, with an automatic color measuring device, Lab values of the 10000 color patches were measured. Then, a color prediction model was built based on the measured Lab values. Specifically, statistic of the measured color data of the 10000 color patches was taken with a multiple regression model, and the color prediction model was built based on the statistic. Values of the grid points were calculated based on the color prediction model, and the DLUT was created.

A color is reproduced by adjusting a toner amount subtly. However, in the present invention, as for a desired color (for example, a color reproduced by a combination of at least two different color toners), basically, RGB data is converted into CMYK data based on data included in the DLUT so that the desired color can be reproduced. At this time, substantially, an amount of each of the C, M, Y, and K toners required to reproduce the target color is calculated based on the data included in the DLUT. Therefore, it is possible to prevent a conventional problem that a color of an output image is different among different models of image forming apparatuses from occurring. The image processing apparatus 1 is configured to correct such a color difference among different models of image forming apparatuses by changing the data included in the DLUT. Therefore, even when different models of image forming apparatuses respectively form the same image, the image processing apparatus 1 can cause each of the image forming apparatuses to form the image in the same color.

Values of the CMYK data to be processed by the image processing apparatus 1 are limited to be within a preset range (in the present embodiment, each of the CMYK data is 8-bit data, so that the values can be set up to 255 as a maximum level). Therefore, in the present embodiment, to express a target color, basically, a toner amount is adjusted to be reduced.

The CMYK color image signals into which the RGB color image signals are converted by the color-separation processing unit are stored in the memory 4. The printer gamma correction unit 5 and the dithering unit 6 respectively perform gamma correction and a dithering process on the CMYK color image signals stored in the memory 4.

Specifically, the printer gamma correction unit 5 converts the CMYK color image signals (the CMYK 8-bit data) into CMYK 8-bit data with a printer gamma table as a one-dimensional look-up table (LUT). By this data conversion, the data can conform to a predetermined input-output relation that is set in advance (a preset relation between the CMYK data after being subjected to the color correction and an amount of toner adhered onto a photosensitive element or an output value from a reflection sensor that detects the toner adhesion amount). The data conversion is performed to absorb and correct a variation of the input-output relation due to variation factors such as an environmental change and a temporal change.

In the data conversion, also, values of the CMYK data are limited to be within the preset range up to 255 as the maximum level. Therefore, a toner adhesion amount cannot be set more than an adhesion amount corresponding to the level 255. The toner adhesion amount is adjusted to not a maximum level (a maximum adhesion amount) but an intermediate level (an intermediate concentration) by the printer gamma correction unit 5.

As described above, when a content of the image information 9 (see FIG. 1) indicates that an object to be output is a POP image, the image processing apparatus 1 is configured to perform halftone processing suitable for the POP image. The halftone processing performed by the image processing apparatus 1 when the object to be output is the POP image (i.e., the halftone processing suitable for the POP image) is explained in detail below.

The image processing apparatus 1 stores therein a matrix in which threshold data called a dither matrix is written in advance. The dithering unit 6 as the halftone processing unit performs halftone processing on the CMYK data into which the RGB data is converted by the printer gamma correction unit 5 by comparing each data values of the CMYK data with the threshold data written in the dither matrix on a pixel-by-pixel basis. In the present embodiment, in the halftone processing, the dithering unit 6 performs a dithering process on the CMYK data so that the CMYK 8-bit data is converted into CMYK 4-bit data. Incidentally, in the present embodiment, it is assumed that both the CMYK data before being subjected to the halftone processing and the CMYK data after being subjected to the halftone processing have the resolution of 600 dpi.

For explaining the dithering unit 6, first, a periodic structure of the dither matrix used in the present embodiment is explained below. A low-density area of the image data subjected to the dithering process has a dot-like periodic structure. Namely, in the present embodiment, a dither matrix so-called a dot screen dither is applied to the low-density area. As a numerical value characterizing the periodic structure of the dither matrix, a screen angle and a screen ruling are frequently used. Thus, first, a screen angle and a screen ruling in a dot screen are explained below.

Figure 2:
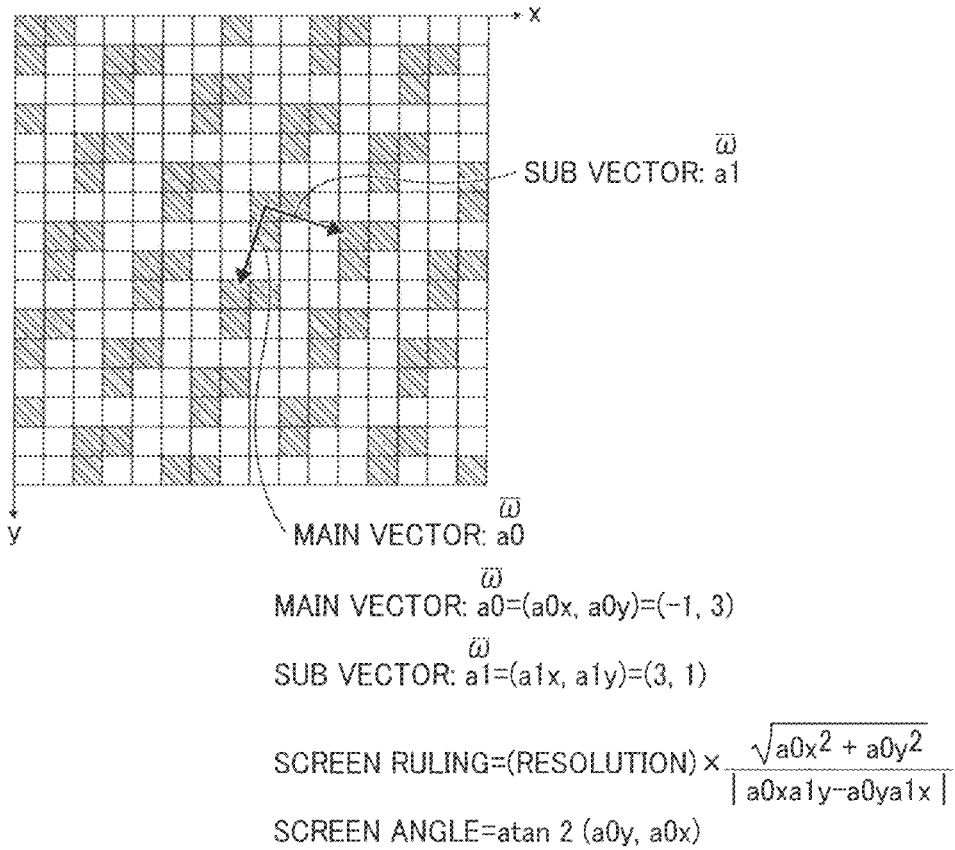
FIG. 2 is a schematic diagram for explaining a relation among a periodic structure, main/sub vectors, and screen angle/ruling in a dot screen.

In a case of a dither matrix having a dot-like periodic structure (a dot screen dither matrix) as shown in FIG. 2, a screen angle and a screen ruling are unambiguously calculated by equations shown in FIG. 2. In general, such a two-dimensional periodic structure is expressed by two two-dimensional vectors. For the sake of convenience, it is assumed that such two vectors are referred to as a main vector and a sub vector.

With the main vector and the sub vector, Table 1 shows a combination of dither matrices (for the C, M, Y, and K colors) used in the present embodiment.

TABLE 1

| No. | RULING [lpi] | ANGLE [deg] | a0x | a0y | a1x | a1y |
|---|---|---|---|---|---|---|
| C | 189.7 | 18.4 | 3 | 1 | 1 | −3 |
| M | 189.7 | 71.6 | 1 | 3 | 3 | −1 |
| Y | 200.0 | 0.0 | 3 | 0 | 0 | −3 |
| K | 212.1 | 45.0 | 2 | 2 | 2 | −2 |

In Table 1, four integers in "a0x", "a0y", "a1x", and "a1y" respectively indicate an x-component of the main vector, a y-component of the main vector, an x-component of the sub vector, and a y-component of the sub vector in FIG. 2. In the present embodiment, the resolution is 600 dpi, so that it can be easily understood that the realization of the periodic structure shown in Table 1 leads to the screen ruling shown in Table 1.

Figure 3:
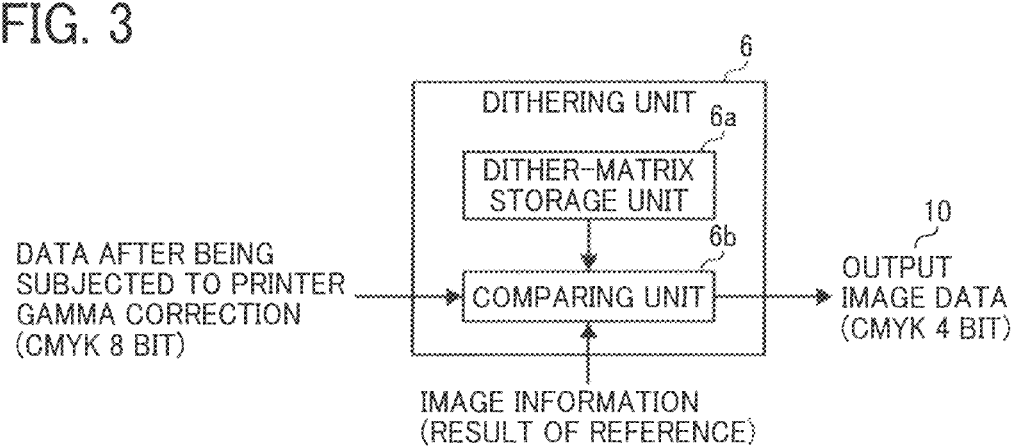
FIG. 3 is a block diagram of a dithering unit as a halftone processing unit shown in FIG. 1.

Subsequently, how the dithering unit 6 converts the CMYK 8-bit data into CMYK 4-bit data is explained below. FIG. 3 is a block diagram of the dithering unit 6 as the halftone processing unit.

As shown in FIG. 3, the dithering unit 6 includes a dither-matrix storage unit 6a and a comparing unit 6b. The dither-matrix storage unit 6a stores therein dither matrices respectively for the C, M, Y, and K colors in advance. Each of the dither matrices is a matrix in which threshold data is written. In the present embodiment, the dithering unit 6 performs a dithering process at a quantization level of 4 bits (16 levels) on the CMYK 8-bit data, so that data after being subjected to the dithering process is 4-bit data (16 levels). At this time, the dithering unit 6 compares a gradation level (out of 256 gradation levels) of each of pixels of the CMYK 8-bit data after being subjected to the printer gamma correction with the threshold data that is preliminarily set by 16 gradation levels (4-bit) from level 0 to level 15, and determines which level (from level 0 to level 15) each of the pixels of the input data belongs to (details are described later). Therefore, each of the 4-bit dither matrices is a matrix composed of 15 planes in which threshold data is written respectively. Namely, the dither-matrix storage unit 6a stores therein four dither matrices respectively for the C, M, Y, and K colors, and each of the C, M, Y, K dither matrices is a matrix composed of 15 Planes in which the threshold data is written respectively.

The comparing unit 6b compares a value of the threshold data stored in the dither-matrix storage unit 6a with a value of the CMYK 8-bit data after being subjected to the conversion by the printer gamma correction unit 5 on a pixel-by-pixel basis, and obtains 4-bit (16-level) CMYK data (output image data 10). The comparison by the comparing unit 6b is concretely explained below. First, the comparing unit 6b focuses on one of the pixels, and compares a gradation level (hereinafter, "a DATA value") of the pixel in the CMYK data after being subjected to the printer gamma correction with threshold data corresponding to the pixel (hereinafter, "a threshold value") in a Plane 1 of the dither matrix. If the DATA value is larger than the threshold value, the comparing unit 6b compares the DATA value with a threshold value in a Plane 2 of the dither matrix. Until the DATA value is equal to or smaller than a threshold value, the DATA value is sequentially compared with threshold values in subsequent Planes. When the DATA value first becomes equal to or smaller than a threshold value in a Plane N of the dither matrix, a value of the pixel is converted into a value of N−1 as a value of the pixel after being subjected to the dithering process. For example, if the DATA value is still larger than a threshold value in a Plane 15 of the dither matrix, a value of the pixel is converted into 15 as a value of the pixel after being subjected to the dithering process. In the first embodiment, by such a conversion, input data is converted into data having 16 levels from level 0 to level 15 (4-bit).

In the present embodiment, as described above, each of the C, M, Y, and K dither matrices is a matrix composed of 15 Planes in which threshold data is written respectively, and the four C, M, Y, and K dither matrices are stored in the dither-matrix storage unit 6*a*. To take the Y dither matrix as an example, the dither matrix is described in greater detail below. FIG. 4 shows the Y dither matrix used in the present embodiment. As shown in Table 1, the Y dither matrix is a dot screen dither defined as a screen ruling of 200 lines per inch [lpi] and a screen angle of 0 degrees [deg.] in a low-density area. The resolution is 600 dpi, so that growth centers appear at intervals of three pixels in both an X direction and a Y direction. In the dot screen dither, as an image density increases, a halftone dot gets larger around the growth center. As is shown by the Panel 1 in FIG. 4, threshold values in both the X direction and the Y direction are diminished at intervals of three pixels, and pixels located at the intervals correspond to the growth centers. Furthermore, as is shown by the Panel 1, a pixel close to the growth center has a small threshold value, and a pixel away from the growth center has a large threshold value. By setting the threshold values like this, a dot-like pattern halftone processing is performed. In other words, in the present embodiment, the halftone processing with the dither matrix shown in FIG. 4 is performed, which results in the dot-like pattern in the low-density area.

Namely, in the low-density area, a growth order causing pixels in the low-density area to grow pixel-by-pixel up to an intermediate level (to grow up to an intermediate level in a depth direction preferentially) is employed (see the Planes 1 to 8 in FIG. 4). Therefore, it is possible to achieve an output image in which a low-density area has a high gradation reproducibility. In an electrophotographic image forming apparatus, pixels in a low-density area (a highlight area) preferably grow pixel-by-pixel in the depth direction preferentially, so that a toner is prone to be adhered, and thus a high gradation reproducibility can be achieved.

On the other hand, as is shown by a Plane 9 in FIG. 4, unlike the Planes 1 to 8, threshold values of all 36 pixels in the Plane 9 are close to one another (in a range of 136 to 152). Similarly, in Planes 10 to 15, threshold values of all 36 pixels in each of the Planes are close to one another. By setting the threshold values like this, all the pixels can grow almost uniformly. Namely, in the present embodiment, the halftone processing with the dither matrix shown in FIG. 4 is performed, and all pixels in a high-density area can grow averagely. FIG. 5 shows data after being subjected to the dithering process as the halftone processing with the dither matrix shown in FIG. 4. In a low-density area, pixels are arranged to form a dot-like pattern, and a whole white background portion is filled with medium-density dots. In a high-density area, all pixels grow averagely (although threshold values of the pixels are not exactly the same, the threshold values of the pixels are not so different from one another unlike those in the low-density area). In this manner, in the present embodiment, all pixels in a high-density area grow averagely thereby presenting a white background portion from appearing. In other words, a toner adhesion amount is changed by changing a condition of a latent image to be formed by optical writing while preventing the white background portion from appearing. Therefore, the present invention makes it possible to control a toner adhesion amount while preventing a white background portion from appearing.

A growth order of the other C, M, K dither matrices is identical to the growth order of the Y dither matrix, and description of the growth order of the C, M, K dither matrices is omitted. In the same manner as the Y dither matrix, the C, M, K dither matrices are also created so as to cause pixels in a low-density area to grow in a dot-like pattern and to cause all pixels in a high-density area to grow averagely. Then, the dithering process is performed with the dither matrices.

In the present embodiment, each of the CMYK data after being subjected to the dithering process is 4-bit data that each of pixels has 16 levels for each of the C, M, Y, K colors. A possible size of data per pixel of each of the CMYK data is referred to as a quantization level (16 levels, in this example). Namely, in the present embodiment, the halftone processing (the dithering process) at a quantization level of 16 levels is performed. However, the present invention is not limited to the quantization level. As long as "a growth order causing all pixels in a high-density area to grow averagely" can be achieved, the present invention can be applied to halftone processing at a quantization level of 3 or more levels. If the quantization level is 2 levels, it is not possible to achieve "a growth order causing all pixels in a high-density area to grow averagely". However, when the quantization level is 3 or more levels, threshold values of all pixels in a high-density area can bring in the intermediate level, so that it is possible to "grow all the pixels in the high-density area averagely".

Furthermore, in the present embodiment, when a value of input data exceeds 136 (136/255⇒ approximately 53%), it is configured to shift to "cause all pixels to grow almost uniformly". Such a value of input data shifting to "cause all pixels to grow almost uniformly" is hereinafter referred to as "a shift point" (in this example, the shift point is approximately 53%). The present invention is not limited to the value of the shift point. Preferably, a shift point is arbitrarily set depending on gradation characteristics of an image forming apparatus or the like. Preferably, a shift point is to be set within a range of 40% to 80% in most cases.

In the present embodiment, as described above, when receiving the image information 9 on a type of the image data to be printed (indicating that an output image is a POP image, in this example) via the external connection unit 7, the image processing apparatus 1 switches a dither matrix to the one suitable for the POP image, and performs a dithering process as halftone processing on input image data with the dither matrix. Subsequently, how to determine whether an output image is a POP image is explained below.

An external device (not shown), such as a personal computer, transmits the image information 9 (indicating, for example, a type of image such as a text image, a photo image, a graphic image, or a POP image) together with information about printing conditions such as a paper size to the image processing apparatus 1 (see FIG. 1). The image processing apparatus 1 receives the image information 9 via the external connection unit 7. In the present embodiment, based on a content of the image information 9, whether an image to be printed is a POP image is determined. For example, it can be simply configured to cause a user to write information indicating a POP image in the image information 9. To cause the user to write the information indicating a POP image in the image information 9, for example, a function enabling the user to specify a POP image can be added to the external device (the personal computer) as a user interface.

Figure 6:
FIG. 6 shows an example of a POP image.

A POP image is an image of point-of-purchase advertising, such as an outdoor advertising signboard of a retail store, a poster, and a price card attached to a wall or a ceiling in a store. A concrete example of a POP image is shown in FIG. 6. As shown in FIG. 6, the purpose of the POP image is to show a product name, a price, and advertising copy to purchasers clearly. Although the POP image shown in FIG. 6 is printed in gray scale, in an actual POP image, an "AS ADVERTISED" portion is printed in red characters on a yellow background, and a "SALE" portion is printed in outline characters on a red background. Furthermore, a "GINJOJUNMAI-SHU" portion, a "<720 ML>" portion, and a bar-code are printed in black characters, a "CHEAP!" portion is printed in navy blue characters, a "TASTY!" portion is printed in blue characters, and a "¥1,100" portion is printed in red characters.

In the present embodiment, whether an image to be output is a POP image is specified by a user (a person who wants to output a POP image) via a user interface of an external device (such as a personal computer). However, the present invention is not limited to this method. Alternatively, whether an output image is a POP image can be determined based on an analysis of image data (for example, by determining whether the image data includes a product name, a price, or advertising copy), and a result of the determination can be output as image information to the external connection unit 7 of the image processing apparatus 1.

In the present embodiment, after receiving the image information 9 via the external connection unit 7, the image processing apparatus 1 stores the received image information 9 in a storage unit (not shown). The image information 9 stored in the storage unit is referred when the image processing apparatus 1 performs halftone processing on image data. Specifically, when a content of the image information 9 stored in the storage unit indicates that a target image is a POP image, the image processing apparatus 1 performs a dithering process suitable for the POP image (a dithering process for causing all pixels in a high-density area to grow averagely).

Furthermore, although it is not illustrated in the drawing, when the image information 9 indicates that a target image is an image other than a POP image (for example, a text image, a photo image, or a graphic image), the image processing apparatus 1 performs not the dithering process suitable for the POP image (the dithering process for causing all pixels in a high-density area to grow averagely) but a conventional dithering process.

Moreover, in the present embodiment, the content of the image information 9 is applied to the halftone processing, but not applied to the color correction, BG/UCR processing, and the printer gamma correction. However, the present invention is not limited to this point. Namely, the content of the image information 9 can be applied to the color correction, the BG/UCR processing, and the printer gamma correction. Any of the processes appropriate to a target image can be performed.

Subsequently, as a modified example of the first embodiment, a full-color image forming apparatus including the image processing apparatus 1 is explained below. The full-color image forming apparatus is capable of forming a full-color image with C, M, Y, and K toners. The full-color image forming apparatus mainly includes the image processing apparatus 1 and four image forming units. How the full-color image forming apparatus forms an image on a recording medium such as a paper sheet upon receiving output image data processed by the image processing apparatus 1 is explained below.

Figure 7:
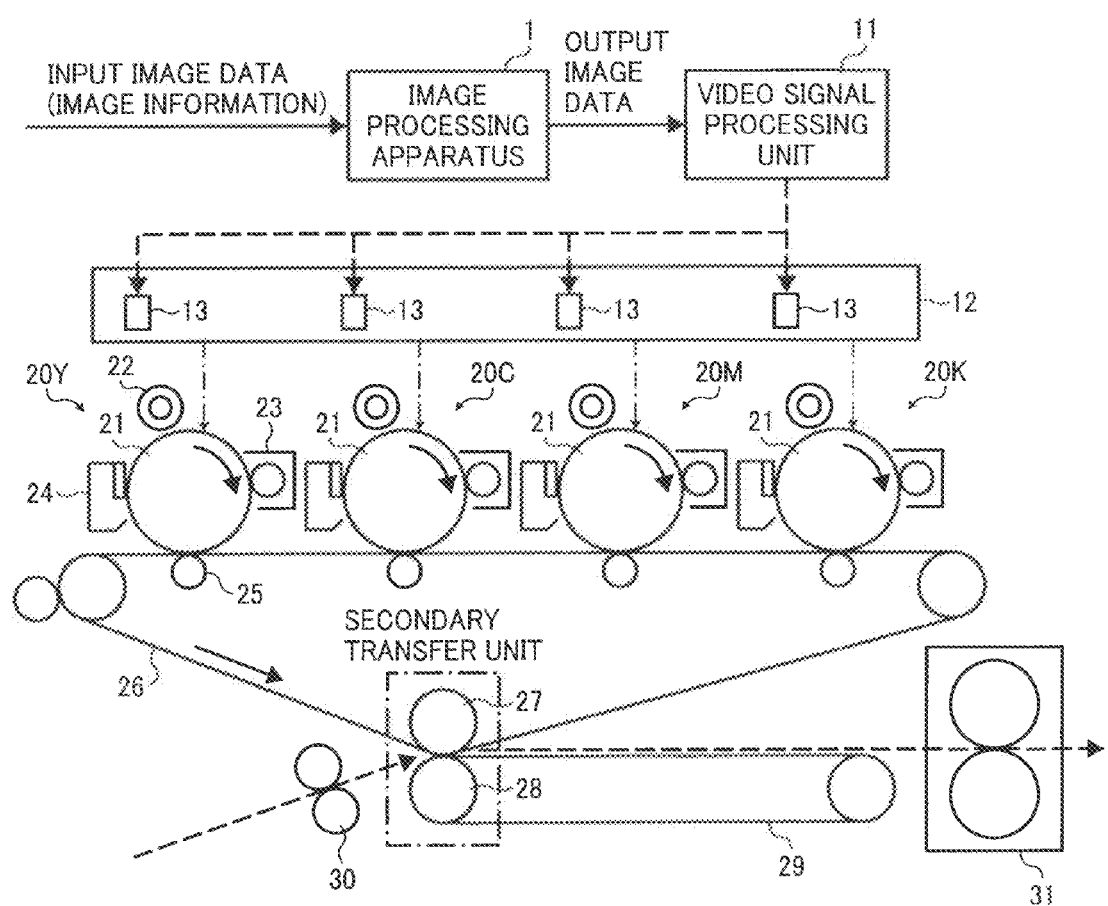
FIG. 7 is a schematic configuration diagram of an image forming apparatus including the image processing apparatus shown in FIG. 1.

FIG. 7 is a schematic diagram of the full-color image forming apparatus according to the modified example of the first embodiment. The full-color image forming apparatus employs an intermediate transfer system. The full-color image forming apparatus forms a full-color image in such a manner that Y, C, M, and K toner images formed on photosensitive drums are primary-transferred onto an intermediate transfer medium in a superimposed manner, and the superimposed toner images on the intermediate transfer medium are secondary-transferred onto a recording medium, such as a paper sheet. Incidentally, the present invention is not limited to the image forming apparatus employing the intermediate transfer system. Alternatively, the present invention can be applied to an image forming apparatus employing a direct transfer system.

Specifically, the image forming apparatus shown in FIG. 7 is a tandem-type full-color image forming apparatus capable of forming a full-color image, and includes four image forming units 20 (20Y, 20M, 20C, 20K) respectively for forming Y, M, C, and K toner images. The image forming units 20 are arranged in parallel with one another on top of a loop intermediate transfer belt 26 as the intermediate transfer medium. The intermediate transfer belt 26 is driven to run in a counterclockwise direction in the diagram by a drive unit (not shown).

The image forming units 20 have the same configuration except for a color of toner to be used therein. Each of the image forming units 20 includes a photosensitive drum 21 as an image carrier, a charging unit 22, a developing unit 23, a cleaning unit 24, and the like. The charging unit 22, the developing unit 23, and the cleaning unit 24 are arranged around the photosensitive drum 21. Four transfer rollers 25 are provided inside the loop of the intermediate transfer belt 26 so as to be opposed to the photosensitive drums 21 respectively across the intermediate transfer belt 26. A nip portion formed between the transfer roller 25 and the photosensitive drum 21 functions as a primary transfer unit.

Furthermore, a laser scanning unit 12 as an optical writing system is provided above the four image forming units 20. A video signal processing unit 11 performs a predetermined process on the output image data from the image processing apparatus 1, and outputs the processed image data to the laser scanning unit 12. The laser scanning unit 12 emits laser beams corresponding to the image data (that the output image data is subjected to halftone processing) to surfaces of the photosensitive drums 21 respectively. Specifically, the laser scanning unit 12 includes four laser diodes (LD) 13 respectively for Y, M, C, and K colors, and the LDs 13 emit laser beams corresponding to Y, M, C, and K color components of the image data to the surfaces of the image forming units 20Y, 20M, 20C, 20K via a rotary beam deflector (not shown). In the present example, the laser scanning unit 12 employs such a laser scanning technique. Instead of the laser scanning unit 12, it is also possible to employ an exposure unit combined with a light-emitting diode (LED) array and an imaging means.

A transfer conveying belt 29 is provided below the intermediate transfer belt 26. A transfer roller 28, as one of supporting rollers that support the transfer conveying belt 29, is pressed against a transfer roller 27 across the intermediate transfer belt 26 and the transfer conveying belt 29. A nip portion formed between the transfer rollers 27 and 28 functions as a secondary transfer unit. A pair of the transfer rollers 27 and 28 is referred to as the secondary transfer unit. A recording medium such as a paper sheet is fed to a pair of registration rollers 30 arranged upstream of the secondary transfer unit in a paper conveying direction by a paper feed unit (not shown). The registration rollers 30 feed the recording medium to the secondary transfer unit. Incidentally, the recording medium is conveyed on a paper path as indicated by a dotted arrow in FIG. 7. Furthermore, a fixing unit 31 is provided downstream of the transfer conveying belt 29 in the paper conveying direction.

How the image forming apparatus configured as described above forms an image on a recording medium is briefly explained below.

The photosensitive drums 21 are driven to rotate in a clockwise direction by a drive unit (not shown). The surface of each of the photosensitive drums 21 is uniformly charged to a predetermined polarity by the charging unit 22. The uniformly-charged surface of the photosensitive drum 21 is exposed to a laser beam emitted from the laser scanning unit 12, and an electrostatic latent image is formed on the surface of the photosensitive drum 21. At this time, each of the photosensitive drums 21 is exposed to the laser beam corresponding to single-color image data, i.e., corresponding one of the Y, M, C, and K image data that image data on a desired full-color image is separated thereinto. The electrostatic latent images formed on the photosensitive drums 21 are developed into Y, M, C, and K toner images by the developing units 23.

As the intermediate transfer belt 26 is driven to run in the counterclockwise direction in FIG. 7, the toner images formed on the photosensitive drums 21 are sequentially transferred onto the intermediate transfer belt 26 in a superimposed manner by the action of the primary transfer units. In this manner, a full-color toner image is carried on the surface of the intermediate transfer belt 26.

Incidentally, the image forming apparatus can form a single-color image with any one of the image forming units 20, and can form a two or three-color image with a plurality of the image forming units 20. When the image forming apparatus forms a black-and-white image, only the image forming unit 20K arranged on the extreme right in FIG. 7 is used.

After the toner image is transferred onto the intermediate transfer belt 26, the cleaning unit 24 removes a residual toner from the surface of the photosensitive drum 21. After that, a neutralization unit (not shown) removes a residual electric charge from the surface of the photosensitive drum 21, thereby initializing a surface potential so as to be ready for a subsequent image formation.

On the other hand, the recording medium is fed to the registration rollers 30 by the paper feed unit. The registration rollers 30 convey the recording medium to the secondary transfer unit in synchronization with the toner image carried on the intermediate transfer belt 26. In the present example, a transfer voltage of a polarity opposite to that of charged toners of the full-color toner image on the surface of the intermediate transfer belt 26 is applied to the transfer roller 28, so that the full-color toner image on the surface of the intermediate transfer belt 26 is collectively transferred onto the recording medium. The recording medium on which the full-color toner image is transferred is conveyed to the fixing unit 31. While the recording medium passes through the fixing unit 31, the full-color toner image is melted and fixed on the recording medium by the application of heat and pressure. In this manner, a full-color image is formed on the recording medium, and the recording medium is discharged onto a copy receiving tray (not shown).

Subsequently, an operation of the LDs 13 that operate in response to output image data created by the image processing apparatus 1 is briefly explained below.

When receiving output image data created by the image processing apparatus 1 (i.e., image data after being subjected to image processing), the video signal processing unit 11 separates the output image data into the same number of data as the number of the LDs 13, and stores the sets of data in a line memory. The video signal processing unit 11 outputs data corresponding to each pixel out of the data stored in the line memory to a pulse width modulation (PWM) control unit (not shown) at a predetermined timing (a pixel clock) in synchronization with a signal output in synchronization with rotation of a polygon mirror (so-called "a synchronization signal"). Incidentally, in the present example, the number of the LDs 13 is four respectively for the Y, M, C, and K colors. The PWM control unit converts the data into a PWM signal, and outputs the PWM signal to an LD driver (not shown). In response to the PWM signal, the LD driver modulates a laser beam emitted from each of LD elements (an LD array) to have a predetermined light intensity. In the present example, a PWM control is performed by each of the color components of the output image data, and then a laser modulation is performed.

A laser beam emitted from the LD 13 is shaped into a parallel beam by a collimating lens. Then, the parallel beam is further shaped into a beam flux having a desired beam diameter by passing through an aperture. After that, the beam flux passes through a cylindrical lens, and reaches the polygon mirror. The beam flux is reflected by the polygon mirror, and collected by a scanning lens (an f-theta lens), and reflected by a reflecting mirror, and then focused on the photosensitive drum 21.

In the image forming apparatus according to the present embodiment, such optical writing by the LD 13 is performed at the resolution of 600 dpi. Furthermore, the PWM signal is produced so as to have a 6-bit flexibility. However, in the image processing apparatus 1, the image data is quantized in the halftone processing, so that the output image data is 600-dpi/4-bit data. Therefore, the emission of the LD 13 is controlled so that 4 bits out of the 6 bits of the PWM signal are associated with the output image data (the data after being subjected to the halftone processing). Thus, the LD 13 emits a laser beam corresponding to the output image data, i.e., 4-bit data (16 levels including a level for a nonluminous state).

In this manner, the modulated laser beam is focused on the photosensitive drum 21 by the laser scanning unit 12, i.e., the photosensitive drum 21 is scanned by the modulated laser beam, and an electrostatic latent image corresponding to the desired image data is formed on the photosensitive drum 21. The electrostatic latent image is developed into a toner image, and the toner image is transferred onto a recording medium as described above. In this manner, a full-color image corresponding to the image data is formed on the recording medium.

The image forming apparatus according to the present example is equipped with the image processing apparatus 1 described above. When an image to be output is a POP image, the image forming apparatus forms an image based on image data subjected to halftone processing suitable for the POP image. Therefore, it is possible to form the image without giving a user an impression that "a solid image is not colored finely". Furthermore, it is possible to finely reproduce a color to be reproduced by a combination of two or more different color toners. Moreover, it is possible to reproduce the same color among different models of image forming apparatuses.

In addition, it is possible to finely reproduce a high-saturation and high-brightness color (i.e., a vivid and bright color).

Subsequently, an image processing apparatus 100 according to a second embodiment of the present invention is explained below. A hardware configuration of the image processing apparatus 100 is identical to that of the image processing apparatus 1, and description of portions identical to those of the image processing apparatus 1 is omitted.

The image processing apparatus 100 is performs a dithering process with a different dither matrix from that is used by the image processing apparatus 1. In the second embodiment, an image after being subjected to a dithering process has a line-like periodic structure. Namely, the image processing apparatus 100 performs the dithering process with a dither matrix so-called a line screen dither. In a case of a line screen, in the same manner as the dot screen in the first embodiment, as a numerical value characterizing the periodic structure of the dither matrix, a screen angle and a screen ruling are used. Details of the screen angle and the screen ruling in the line screen are explained below.

Figure 8:
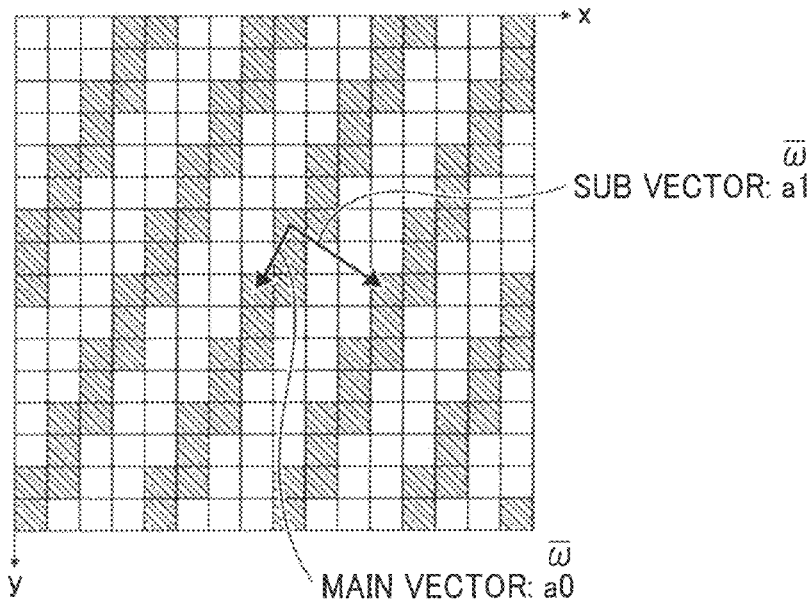
FIG. 8 is a schematic diagram for explaining a relation among a periodic structure, main/sub vectors, and screen angle/ruling in a line screen.

In the line screen, the screen angle and the screen ruling are unambiguously calculated by equations shown in FIG. 8. In the same manner as the dot screen, in the line screen, a two-dimensional periodic structure is expressed by two two-dimensional vectors. For the sake of convenience, it is assumed that such two vectors are referred to as a main vector and a sub vector.

With the main vector and the sub vector, Table 2 shows a combination of dither matrices (for the C, M, Y, and K colors) used in the second embodiment.

TABLE 2

| No. | RULING [lpi] | ANGLE [deg] | a0x | a0y | a1x | a1y |
|-----|--------------|-------------|-----|-----|-----|-----|
| C   | 212.1        | 45.0        | 2   | 2   | 2   | −2  |
| M   | 212.1        | 135.0       | −2  | 2   | 2   | 2   |
| Y   | 200.0        | 0.0         | 3   | 0   | 0   | −3  |
| K   | 200.0        | 90.0        | 0   | 3   | 3   | 0   |

In Table 2, four integers of "a0x", "a0y", "a1x", and "a1y" respectively indicate an x-component of the main vector, a y-component of the main vector, an x-component of the sub vector, and a y-component of the sub vector in FIG. 8. In the second embodiment, the resolution is also 600 dpi, so that it can be easily understood that the realization of the periodic structure shown in Table 2 leads to the screen ruling shown in Table 2.

Subsequently, a C dither matrix used in the second embodiment is explained below. FIG. 9 shows the C dither matrix used in the second embodiment. As shown in Table 2, the C dither matrix is a line screen dither defined as a screen ruling of 212 [lpi] and a screen angle of 45 [deg.] in a low-density area. Therefore, the C-color image is formed in a pattern like a string of lines in a 45-degree direction. As an image density increases, a width of the lines gets thick. As is shown by a Plane 1 in FIG. 9, threshold values arranged in the 45-degree direction are gradually diminished, i.e., a string of dither patterns is formed in the 45-degree direction. In the second embodiment, by setting the threshold values like this, a line-like halftone processing is performed. As a result, the line-like pattern appears in the low-density area. In other words, in the second embodiment, the halftone processing process with the dither matrix shown in FIG. 9 is performed, which results in the line-like pattern in the low-density area.

Namely, in the low-density area, a growth order causing pixels in the low-density area to grow pixel-by-pixel up to an intermediate level (to grow up to an intermediate level in the depth direction preferentially) is employed (see Planes 1 to 8 in FIG. 9). Therefore, it is possible to achieve an output image in which a low-density area has a high gradation reproducibility. In an electrophotographic image forming apparatus, pixels in a low-density area (a highlight area) preferably grow pixel-by-pixel in the depth direction preferentially, so that a toner is prone to be adhered, and thus a high gradation reproducibility can be achieved.

On the other hand, as is shown by the Plane 9 in FIG. 9, unlike the Planes 1 to 8, threshold values of all 16 pixels in the Plane 9 are close to one another (in a range of 136 to 151). Similarly, in Planes 10 to 15, threshold values of all 16 pixels in each of the Planes are close to one another. By setting the threshold values like this, all the pixels can grow almost uniformly. Namely, in the second embodiment, the halftone processing with the dither matrix shown in FIG. 9 is performed, and all pixels in a high-density area can grow averagely.

FIG. 10 shows data after being subjected to the dithering process as the halftone processing with the dither matrix shown in FIG. 9. In a low-density area, pixels are arranged to form a line-like pattern, and a whole white background portion is filled with medium-density dots. In a high-density area, all pixels grow averagely (although threshold values of the pixels are not exactly the same, the threshold values of the pixels are not so different from one another unlike those in the low-density area).

In this manner, in the second embodiment, all pixels in a high-density area grow averagely thereby presenting a white background portion from appearing. In other words, a toner adhesion amount is changed by changing a condition of a latent image to be formed by optical writing while preventing the white background portion from appearing. Therefore, the present invention makes it possible to control a toner adhesion amount while preventing a white background portion from appearing.

In the second embodiment, a growth order of the other M, Y, K dither matrices is identical to the growth order of the C dither matrix, and description of the growth order of the M, Y, K dither matrices is omitted. In the same manner as the C dither matrix, the M, Y, K dither matrices are also created so as to cause pixels in a low-density area to grow in a line-like pattern and to cause all pixels in a high-density area to grow averagely. Then, the dithering process is performed with the dither matrices.

Subsequently, another configuration example of the image forming apparatus is explained below with reference to FIG. 11.

An image forming apparatus shown in FIG. 11 is a full-color image forming apparatus including a revolver-type developing device, and employs a direct transfer system that a toner image formed on an image carrier is directly transferred onto a recording medium. This full-color image forming apparatus includes one image carrier (for example, a photosensitive drum) 41.

In the full-color image forming apparatus shown in FIG. 11, a charging unit 42, a revolver-type developing device 43, and a cleaning unit 44 are arranged around the photosensitive drum 41. Furthermore, a transfer unit 45 is provided inside a paper conveying drum 46. The revolver-type developing device 43 includes four developing units respectively containing C, Y, M, and K toners. The revolver-type developing device 43 is driven to rotate so as to move the desired developing unit to a developing position. When a black-and-white image is formed, the developing unit containing the K toner is moved to the developing position, and a developing process is performed.

Such an image forming apparatus employing the revolver-type developing device is a well-known technology, so that detailed description of the image forming apparatus is omitted. When a full-color image is formed with the C, Y, M, and K toners, the photosensitive drum 41 makes at least four revolutions. After C, Y, M, and K toner images are formed on a surface of the photosensitive drum 41 in a superimposed manner, i.e., a full-color toner image is formed on the surface of the photosensitive drum 41, the paper conveying drum 46 comes in contact with the photosensitive drum 41, and the full-color toner image on the photosensitive drum 41 is collectively transferred onto a recording medium carried on the paper conveying drum 46 by the action of the transfer unit 45. The recording medium on which the full-color toner image is transferred is conveyed to a fixing unit 47. The full-color toner image is melted and fixed on the recording medium by the fixing unit 47, and a full-color image is formed on the recording medium.

The image forming apparatus according to the present example is also equipped with the image processing apparatus 1. When received image information indicates that an output image is a POP image, the image forming apparatus forms an image based on image data subjected to halftone processing suitable for the POP image. Therefore, it is possible to form the image without giving a user an impression that "a solid image is not colored finely". Furthermore, it is possible to finely reproduce a color to be reproduced by a combination of two or more different color toners. Moreover, it is possible to reproduce the same color among different models of image forming apparatuses. In addition, it is possible to finely reproduce a high-saturation and high-brightness color (i.e., a vivid and bright color).

The present invention is explained above with reference to the accompanying drawings. However, the present invention is not limited to the above embodiments. Various changes and modifications can be arbitrarily made without departing from the spirit and scope of the invention. For example, a quantization level and the number of shift points in halftone processing (a dithering process) can be set arbitrarily. Furthermore, whether an output image is a POP image can be determined by any other methods.

Moreover, the above-described configuration of the image forming unit in the image forming apparatus is just one example, and other configurations can be employed arbitrarily. For example, the order of the image forming units in the tandem-type full-color image forming apparatus is not limited to that is shown in FIG. 7. Furthermore, the present invention can be applied to not only the tandem-type full-color image forming apparatus or the full-color image forming apparatus including the revolver-type developing device but also other types of full-color image forming apparatuses, such as the one in which a plurality of developing units are arranged around one photosensitive element. Moreover, as the image forming apparatus, the present invention is not limited to a printer. The present invention can be applied to a copier, a facsimile machine, and a multifunction product (MFP) having multiple functions.

As described above, according to one aspect of the present invention, in a medium-density area, a surface of a recording medium is entirely covered with toner. Therefore, in an area having a higher density than that of the medium-density area, a white background portion (an area where a portion of the surface of the recording medium is exposed or an area where a lower-level toner layer is exposed) does not appear in so-called a solid image. Even though the white background portion can be prevented from appearing in the high-density area, it is still possible to control (reduce) a toner amount within a predetermined range.

Namely, even when a toner amount is controlled to be reduced, an area where the surface of the recording medium is exposed does not appear. Therefore, it is possible to form an image without giving a user an impression that "the solid image is not colored finely". Furthermore, it is possible to control the toner amount (to change the toner amount subtly) while preventing the area where the surface of the recording medium is exposed from appearing on the image, and thus it is possible to finely reproduce a color to be reproduced by a combination of two or more different color toners. Moreover, it is possible to reproduce the same color among different models of image forming apparatuses.

In addition, even when the toner amount is controlled to be reduced, the area where the surface of the recording medium is exposed does not appear. Therefore, it is possible to finely reproduce a high-saturation and high-brightness color (i.e., a vivid and bright color). Thus, it is possible to achieve an eye-catching image as an important source of a POP image.

Furthermore, according to another aspect of the present invention, it is possible to achieve an output image in which a low-density area has a high gradation reproducibility. In an electrophotographic image forming apparatus, pixels in the low-density area (a highlight area) preferably grow pixel-by-pixel in a depth direction preferentially, so that a toner is prone to be adhered, and thus a gradation reproducibility can be improved. Based on such characteristics, it is also possible to achieve that "the white background portion can be prevented from appearing in the high-density area".

Moreover, according to still another aspect of the present invention, halftone processing is performed with dithering. In the dithering, calculation is relatively simple as compared with other methods for the halftone processing. Therefore, it is possible to lessen a burden of calculation on a processing system, so that the halftone processing can be performed at high speed. When an actual image forming apparatus is equipped with the image processing apparatus according to the present invention, sizes of hardware or software can be minimized, and a necessary memory capacity can be reduced. Therefore, it is possible to provide the image forming apparatus at low cost.

In an electrophotographic image forming apparatus, a reproducibility and a stability of each dot are poor. However, the halftone processing with the dithering is suitable for such an electrophotographic system poor in dot reproducibility and stability. For example, as another method for halftone processing, random dithering is applied to the electrophotographic system, an output image may have grainness or banding, which resulting in a low image quality. On the other hand, when the dithering is applied to the electrophotographic system, such problems do not occur. Thus, it is possible to output a high-quality image. In other words, in the electrophotographic image forming apparatus, by the application of the halftone processing with the dithering, it is possible to output a high-quality image while minimizing grainness or banding.

Furthermore, according to still another aspect of the present invention, in a low-density area causing pixels to grow pixel-by-pixel up to an intermediate level, dot-like pattern halftone processing is performed. By performing the dot-like pattern halftone processing, it is possible to shorten a perimeter of each halftone dot. This leads to a high density stability. This is because an amount of toner adhered to the halftone dot increases/decreases due to variation factors such as an environmental change. At this time, how a toner adhesion area spreads is a main factor in a fluctuation in image density (the fluctuation is caused by not the change in toner adhesion amount but the spread of the toner adhesion area). As the perimeter of each halftone dot gets longer, the toner adhesion area is more prone to spread. Therefore, a dot-like shape can obtain the shortest perimeter, so that it is possible to suppress the fluctuation in image density. Namely, the fluctuation in image density due to various variation factors is less likely to occur, so that it is possible to output an image stably.

Moreover, according to still another aspect of the present invention, in a low-density area causing pixels to grow pixel-by-pixel up to an intermediate level, line-like pattern halftone processing is performed. By performing the line-like pattern halftone processing, it is possible to suppress color moire appearing when a plurality of different color toner images are overlapped. When the line-like pattern halftone processing is performed, frequency components of a periodic structure are oriented in one direction. Therefore, when a plurality of different color toner images are overlapped, a combination of periodic structures so that frequency components are discretely arranged can be easily selected. As a result, color moire generated by interference of the periodic structures (moire generated by interference of the different color toner images) can be visually obscured, and the cycle of the interference can be fine down. Therefore, it is possible to achieve an output image without color moire visually. In other words, it is possible to achieve an output image that color moire is obscured.

Furthermore, according to still another aspect of the present invention, it is possible to form a full-color image in any colors in a visually reproducible fashion.

Moreover, according to still another aspect of the present invention, even when image information does not expressly indicate that a target image is a POP image, it is possible to determine that a target image is a POP image, and an eye-catching POP image can be formed.

Furthermore, according to still another aspect of the present invention, it is possible to perform exposure responding to an image quality required for a POP image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
    a connection unit that receives image data to be printed and image information on a type of the image data from an external device; and
    a pseudo-halftone processing unit that converts the image data into pseudo-halftone image data, wherein,
    in response to a determination that the image information received from the external device indicates that the type of the image data is a point-of-purchase advertising image based on whether the image data includes one of a product name and a price,
    the pseudo- halftone processing unit performs a pseudo-halftone processing on the image data at a quantization level of three or more bits on a pixel and takes a growth order causing all pixels in a high-density area to grow averagely;
    the pseudo-halftone processing unit performs another pseudo-halftone processing on the image data, in response to a determination that the type of the image data is not the point-of-purchase advertising image, and the another pseudo-halftone processing is different from the pseudo-halftone processing performed in response to the determination that the type of the image data is the point-of-purchase advertising image.

2. The image processing apparatus according to claim 1, wherein the pseudo-halftone processing unit performs the pseudo-halftone processing based on a dithering.

3. The image processing apparatus according to claim 1, wherein the image data is four-color image data including cyan, magenta, yellow, and black.

4. An image forming apparatus comprising an image processing apparatus according to claim 1.

5. The image forming apparatus according to claim 4, further comprising:
    an image analyzing unit that analyzes the image data, and makes the determination whether the type of the image data is the point-of-purchase advertising image; and
    a sending unit that sends a result of the determination to the connection unit.

6. The image forming apparatus according to claim 5, wherein the image analyzing unit makes the determination based on whether the one of the product name and the price is included in the image data.

7. The image forming apparatus according to claim 4, further comprising: a photosensitive element as an image carrier;
    a laser-light emitting unit as an exposure unit for forming an electrostatic latent image on the photosensitive element; and
    a control unit that controls the laser-light emitting unit based on data obtained by performing the pseudo-halftone processing on the image data.

8. An image processing apparatus, comprising:
    a connection unit that receives image data to be printed and image information on a type of the image data from an external device; and
    a pseudo-halftone processing unit that converts the image data into pseudo-halftone image data, wherein,
    in response to a determination that the image information received from the external device indicates that the type of the image data is a point-of-purchase advertising image based on whether the image data includes one of a product name and a price,
    the pseudo- halftone processing unit performs a pseudo-halftone processing on the image data at a quantization level of three or more bits on a pixel, takes a growth order causing pixels in a low-density area to grow pixel-by-pixel up to an intermediate quantization level, and takes a growth order causing all pixels in a high-density area to grow averagely;
    the pseudo-halftone processing unit performs another pseudo-halftone processing on the image data, in response to a determination that the type of the image data is not the point-of-purchase advertising image, and the another pseudo-halftone processing is different from the pseudo-halftone processing performed in response to the determination that the type of the image data is the point-of-purchase advertising image.

9. The image processing apparatus according to claim 8, wherein the pseudo-halftone processing unit performs the pseudo-halftone processing based on a dithering.

10. The image processing apparatus according to claim 9, wherein in the low-density area, the pseudo-halftone processing unit performs the pseudo-halftone processing with a dot pattern.

11. The image processing apparatus according to claim 9, wherein in the low-density area, the pseudo-halftone processing unit performs the pseudo-halftone processing with a line pattern.

12. The image processing apparatus according to claim 8, wherein the image data is four-color image data including cyan, magenta, yellow, and black.

13. An image forming apparatus comprising an image processing apparatus according to claim 8.

14. The image forming apparatus according to claim 13, further comprising: an image analyzing unit that analyzes the image data, and makes the determination whether the type of the image data is the point-of-purchase advertising image; and
  a sending unit that sends a result of the determination to the connection unit.

15. The image forming apparatus according to claim 14, wherein the image analyzing unit makes the determination based on whether the one of the product name and the price is included in the image data.

16. The image forming apparatus according to claim 13, further comprising:
  a photosensitive element as an image carrier;
  a laser-light emitting unit as an exposure unit for forming an electrostatic latent image on the photosensitive element; and
  a control unit that controls the laser-light emitting unit based on data obtained by performing the pseudo-halftone processing on the image data.

17. A method implemented by an image processing apparatus, the method comprising:
  receiving image data to be printed and image information on a type of the image data from an external device;
  converting the image data into pseudo-halftone image data;
  performing, with the image processing apparatus, a pseudo-halftone processing on the image data at a quantization level of three or more bits on a pixel and taking a growth order causing all pixels in a high-density area to grow averagely, in response to a determination that the image information received from the external device indicates that the type of the image data is a point-of-purchase advertising image based on whether the image data includes one of a product name and a price; and
  performing, with the image processing apparatus, another pseudo-halftone processing on the image data, in response to a determination that the type of the image data is not the point-of-purchase advertising image, wherein
  the another pseudo-halftone processing is different from the pseudo-halftone processing performed in response to the determination that the type of the image data is the point-of-purchase advertising image.

* * * * *